3,186,537
METHOD OF CONVEYING TITANIUM DIOXIDE
Warren C. Burgess, Jr., 18900 Detroit Road,
Cleveland, Ohio
Filed Apr. 10, 1963, Ser. No. 272,014
3 Claims. (Cl. 198—220)

This invention relates, as indicated, to a method for conveying titanium dioxide, and more particularly to a method for conveying by vibratory means finely divided titanium dioxide.

Heretofore, it has been impossible to convey titanium dioxide in finely divided form. Titanium dioxide having a particle size such that it is useful as a pigmentary material e.g. from .001 to 2 microns in size. With $TiO_2$ of this order of size, electrically powered vibrators of the electromagnetic or electromechanical types do not convey this material at all.

I have now discovered that titanium dioxide of a pigmentary grade can be vibratorily conveyed along a receptacle which is vibrated by a pneumatically driven double acting free piston vibration inducing device. While pneumatically driven vibratory conveyors have been known for some time now, they have not been used for this purpose because this problem with titanium dioxide has heretofore remained unsolved. Accordingly, today, $TiO_2$ is transported and currently handled in bags. By the present discovery it is now possible to handle $TiO_2$ in bulk. Thus, the manufacturer can store the product in bulk, load into bulk material carriers, convey in bulk to the consumer's bulk storage, and the consumer can utilize the material with the aid of a pneumatically driven bulk conveyor. Bag filling, storing, shipping, and bag handling and disposal by the customer are eliminated.

Figure 1:
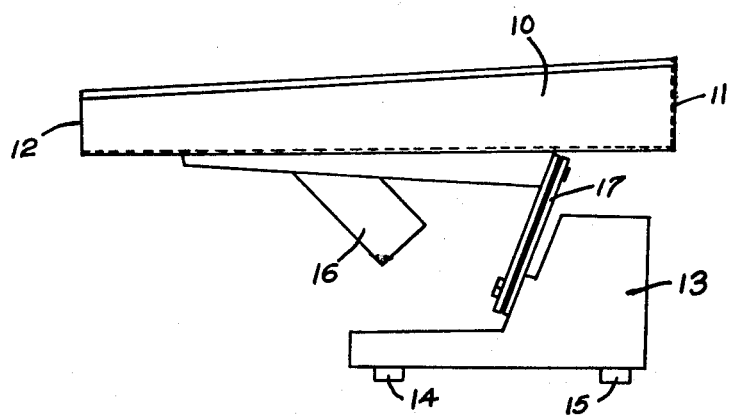
FIG. 1 shows in diagrammatic form a pneumatically driven vibratory conveyor which may be used to convey titanium dioxide in accordance with this invention.

In FIG. 1 there is shown a receptacle 10 having a closed back 11 and an open mouth or delivery exit 12. Receptacle 10 is supported on one or more flat springs anchored to the receptacle 10 and to the base 13. Base 13 is desirably a massive weight to improve the efficiency of the apparatus. Resilient pads 14 and 15 aid in stabilizing the apparatus on a supporting table or pallet.

The apparatus is driven by a pneumatic free piston vibration inducing device 16. Devices of the type best suited for the purposes of this invention are fully described in Patent No. 2,861,548 dated November 25, 1958. The vibration inducing devices of this latter invention are of the quiet acting type wherein the piston alternately reacts against a trapped volume of air in the end chambers so that the piston does not contact the cylinder head at each end of the cylinder. Such action is insured by providing end clearance at cut-off as fully described in that patent.

I may also use vibration inducers of the impacting type where the piston is allowed to impact against an anvil at each end of the cylinder. But for reasons of conditions attendant their use, I prefer to use the quiet acting free piston vibration inducing devices.

The supporting springs are preferably flat springs of the fiber-glass reinforced resin type. Although flat steel springs of conventional design may be used, their life is too short under the conditions of conveying $TiO_2$ to recommend their use. In Patent No. 2,969,971, there have been fully described fiber glass reinforced resinous flat springs of the type which are used with advantage in this invention.

The receptacle 10 may have any desired cross-sectional configuration, that is, the receptacle 10 may be tubular, V-shaped, U-shaped, or a rectangular channel having a flat bottom and vertical upstanding sides.

Such an apparatus operated with the above-described pneumatic vibration inducing devices will convey titanium dioxide at rates up to 4 tons per hour in a receptacle 5" wide by 30" long with 4" side walls. The piston diameter used was 1⅝" x 2" long and the air pressure 48.5 p.s.i.g., and with 4 fiber glass reinforced plastic springs 6" x 2" x ⁵⁄₃₂", set up as pairs in side-by-side relation.

When the pneumatic drive is replaced with an electromagnetic drive and the device operated at a frequency and amplitude which is satisfactory with the pneumatic vibration inducer, titanium dioxide cannot be fed at all. The same result is obtained with a mechanical vibrator.

It is believed that this unusual and unobvious effect is due in part at least to the nearly square wave power curve obtainable with the pneumatic vibration inducing device and which is not obtainable with the electrically driven devices. The latter shows a nearly perfect sine wave profile.

Figure 2:
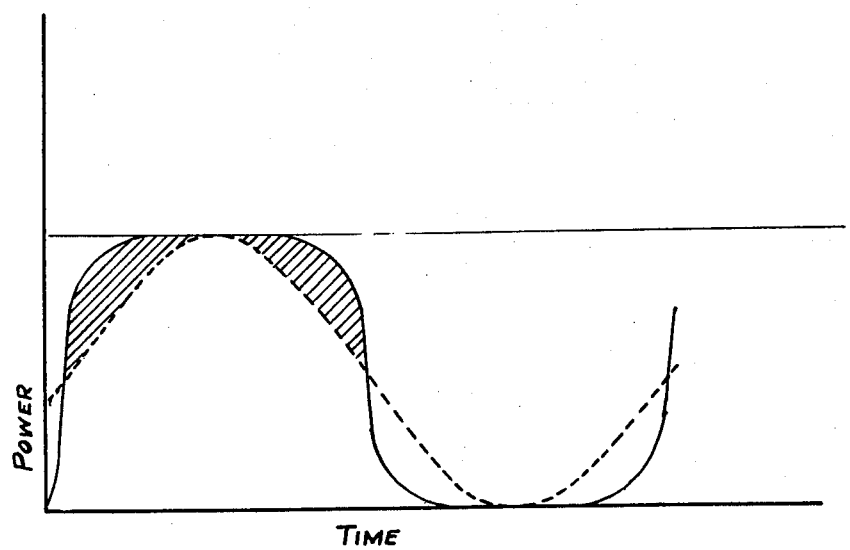
FIG. 2 shows a power curve typical of a pneumatically driven free piston vibration inducing device which is capable of vibratorily conveying titanium dioxide.

FIG. 2 compares the power of a pneumatically driven vibration inducer with that of an electromagnetically driven device. The shaded area is believed to represent the area within which it is desired to operate.

When operating along a sine wave profile, with a finely divided material such as titanium dioxide, the transition from the acceleration to deceleration and finally stopping (at the point where the curve changes direction) is so smooth that as the receptacle begins to accelerate in a negative direction, it virtually sucks a material such as titanium dioxide along with it. Under such circumstances, the tendency is for titanium dioxide to remain stationary on the receptacle floor, and hence there is no conveying regardless of the frequency of vibration or the amplitude of vibration.

However, with the pneumatically driven free piston vibration inducing device, the application of power to the piston continues to almost the conclusion of its stroke. It is arrested by the confined compressed air and then accelerated in the reverse direction, passing the air inlet port which maintains the acceleration rate toward the opposite end of the cylinder and again up to the point of compression in the cylinder head after "cut-off," there is no gradual transition from acceleration to deceleration. Thus, the power profile is more nearly rectangular in shape. With such a profile, a very finely divided material such as titanium dioxide has sufficent power imparted to the particles thereof to enable them to break away from the surface, the surface remains stationary for a period of time to permit such break away, and then is sharply accelerated in the reverse direction after the tendency of the particles to cohere to the receptacle base has been broken. Accordingly, the particles are permitted to progress along the base of the receptacle.

Utilizing an apparatus as above described and operating at a frequency of 2940 cycles per minute, I have been able to transport titanium dioxide at depths up to 3" at amplitudes ranging from about .015" to about 0.4". Transfer of titanium dioxide with a pneumatically driven apparatus has also been affected at frequencies ranging from about 1800 to about 4000 cycles per minute. 3" appears to be about a maximum depth for the apparatus having the dimensions given above, the delivery from such an apparatus at a 3" depth being about 4.2 tons per hour. At depths of material below about 0.1", the delivery rate falls off substantially to about .2 ton per hour.

A typical titanium dioxide pigment has a particle size which averages from about 0.22 to about 0.26 micron. More recent improvements in the manufacture of titanium dioxide pigments have resulted in the production of products having an average particle size of 0.18 micron. These materials may be conveyed according to the method of this invention.

With very fine light materials of the type useful as pigments in coating compositions, there is an appreciable suction between the trough or receptacle surface and the material, which tends to pull the material along with the trough on the retract stroke. Conveying action depends on breaking the material loose at the end of the extend (forward and upward) half of the cycle, at which point the material must follow a forward ballistic-type trajectory while the trough is being retracted. The inertial force of the material due to its mass and the acceleration required to follow the trough surface (on the rearward stroke), must exceed the suction force between the trough surface and the material if a conveying action is to result.

The acceleration characteristics of the high compression, free-piston vibration inducing device are ideal for effective feeding since the power cycle is in the graphical form of a nearly square wave as compared with the gentler sine wave of an electromagnetic type drive. Trough accelerations comparable to very high frequencies are thus achieved.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of vibratorily conveying a finely divided particulate material having a particle size in the range of from about 0.001 micron to about 2 microns which comprises applying said material to a vibratable receptacle at a depth of from about 0.1" to about 3", and reciprocating said receptacle with a vibration inducer, which produces a substantially square wave profile reflecting abrupt changes from acceleration to deceleration, at a frequency of from about 1800 to about 4000 cycles per minute at an amplitude of from 0.015" to about 0.4".

2. The method of claim 1 in which the finely divided particulate material is titanium dioxide.

3. A method for conveying a finely particulate material having a particle size in the range of from about 0.001 micron to about 2 microns which comprises:
 (a) depositing said material on a conveying surface to a depth of from about 0.1 inch to about 3 inches,
 (b) cyclically applying and removing an impulse to the conveying surface having a component of force in the direction of conveyance and a component of force normal to the conveying surface to reciprocate the conveying surface in a predetermined manner,
 (c) the cyclic application and removal of said impulse being at a frequency at from about 1,800 to about 4,000 cycles per minute and at an amplitude providing a resultant stroke of from about 0.015 inch to about 0.4 inch, and
 (d) controlling the application and removal of said impulse to provide a substantially abrupt acceleration and deceleration respectively of the conveying surface characterized by a substantially square wave power cycle.

References Cited by the Examiner

UNITED STATES PATENTS 2,985,279  5/61  Burgess.

FOREIGN PATENTS 585,233  10/59  Canada.

SAMUEL F. COLEMAN, *Primary Examiner.*
ERNEST A. FALLER, JR., *Examiner.*